United States Patent [19]

Middleton et al.

[11] Patent Number: 4,821,319
[45] Date of Patent: Apr. 11, 1989

[54] SINGLE LINE TELEPHONE COMMUNICATION SYSTEM

[75] Inventors: Francisco A. Middleton, Newtown; David A. Zeller, Jr., Brookfield, both of Conn.

[73] Assignee: Alcatel USA Corp., New York, N.Y.

[21] Appl. No.: 47,586

[22] Filed: May 5, 1987

Related U.S. Application Data

[63] Continuation of Ser. No. 726,733, Apr. 25, 1985, abandoned.

[51] Int. Cl.⁴ ............................................. H04M 3/56
[52] U.S. Cl. ................................... 379/167; 379/159; 379/399
[58] Field of Search ............... 379/102, 103, 104, 156, 379/157, 158, 159, 160, 161, 163, 164, 165, 166, 167, 168, 169, 170, 171, 172, 173, 200, 387

[56] References Cited

U.S. PATENT DOCUMENTS

| | | | |
|---|---|---|---|
| 3,904,834 | 9/1975 | Shinoi et al. | 379/159 |
| 4,088,846 | 5/1978 | McEowen | 379/156 |
| 4,096,358 | 6/1978 | Bidlack et al. | 379/159 |
| 4,117,274 | 9/1978 | Cannon et al. | 379/161 |
| 4,135,063 | 1/1979 | Bosen | 379/159 |
| 4,188,511 | 2/1980 | Smith et al. | 379/158 |
| 4,196,317 | 4/1980 | Bartelink | 379/159 |
| 4,254,306 | 3/1981 | Sekiguchi et al. | 379/161 |
| 4,266,103 | 5/1981 | White | 379/161 |
| 4,324,954 | 4/1982 | Taylor | 379/355 |
| 4,332,985 | 6/1982 | Samuel | 379/353 |
| 4,408,102 | 10/1983 | Lumpkin | 379/101 |
| 4,443,665 | 4/1984 | Alderman | 379/194 |
| 4,446,339 | 5/1984 | Bolgiano | 379/372 |
| 4,482,786 | 11/1984 | Flynn, Jr. | 379/165 |
| 4,485,273 | 11/1984 | Bartelink | 379/159 |
| 4,528,424 | 7/1985 | Middleton et al. | 379/183 |
| 4,536,615 | 8/1985 | Kimijima et al. | 379/159 |
| 4,538,031 | 8/1985 | Benning et al. | 379/103 |
| 4,572,928 | 2/1986 | Nishimura et al. | 379/159 |
| 4,578,540 | 3/1986 | Borg et al. | 379/200 X |
| 4,636,589 | 1/1987 | Lee | 379/163 X |
| 4,665,544 | 5/1987 | Honda et al. | 379/104 |
| 4,674,115 | 6/1987 | Kaleita et al. | 379/201 |
| 4,703,499 | 10/1987 | Fossas et al. | 379/194 |

OTHER PUBLICATIONS

"New 104 Key Telephone System", K. Kato et al., Japan Telecommunications Review, Oct. 1981, pp. 323-326.

Primary Examiner—Jin F. Ng
Assistant Examiner—Randall S. Vaas
Attorney, Agent, or Firm—Peter C. Van Der Sluys

[57] ABSTRACT

A communication system for use with a single pair of externally provided telephone wires and a single pair of in-house wires for the provision of full intercom services and/or PABX type features to a plurality of subsets includes a line interface module connected between the single pair of externally supplied wires and a single pair of in-house wires. In addition, each subset is provided with a station adapter module between it and the single pair of in-house wires.

6 Claims, 4 Drawing Sheets

SINGLE LINE TELEPHONE COMMUNICATION SYSTEM

This is a continuation of co-pending application Ser. No. 726,733 filed on Apr. 25, 1985, now abandoned.

BACKGROUND OF THE INVENTION

The present invention generally relates to a telephone communication system and, in particular, relates to one such telephone communication system having a line interface means for establishing communication with a single externally provided pair of telephone wires and means, associated with each of a plurality of telephone subsets, for establishing communication between either another one of the plurality of telephone subset or, via the line interface means, to the single externally provided pair of telephone wires.

In recent years telephone subscribers in the United States and other countries have become entitled to connect their own equipment to externally provided telephone lines. Consequently, a rapid expansion in residential oriented telephone systems and equipment has been developing to satisfy an ever growing number of needs related to such telephone communications.

One particular identified need in such residences is the ability to communicate between and among a plurality of telephone subsets all being interconnected with the single central office telephone line pair of wires that accesses the residence. In addition, other identified needs of subscribers are similar to those of businesses having an independent private automatic branch exchange (PABX). However, the residential subscriber usually does not have the resources to purchase such an exchange. Nevertheless, numerous attempts have been made to provide the PABX type features with systems directed for sale in the residential market. This market, in the field of telephone exchange equipment is unique in requiring equipment that is considerably lower in cost than past similarly functioning equipment as well as requiring relatively simplified installation to allow the subscriber to install the equipment without requiring a representative of a telephone service company.

As it happens, this burgeoning market is not at all limited to residences. For example, many small businesses, such as hardware stores, drug stores, retail outlets and the like, also have need for a communication system having many PABX type features. In addition, a common characteristic in many small businesses, in particular, doctor's offices and other professional offices, is the need to permit multiple user access to a minimal number of telephone lines. The most conventional arrangement is commonly known as a "secretarial system" where a telephone line is, in fact, shared between a supervisor and a secretary. Typically, such secretarial systems permit incoming calls to be screened by the secretary and, in addition, allow intercommunication between the secretary and the supervisor for local communications. Present secretarial systems not only require specialized telephone subsets but, additionally, require special wiring for the intercommunication feature, i.e. usually about 10 to 25 pairs of wires. Although limited versions of telephone communication systems exist, a vast majority of present systems require individual interconnections to a master control switch and thus are disadvantageous by requiring either a re-wiring cost upon installation and/or a prohibitive cost penalty for the subsequent inclusion of additional subsets.

In general, consumers of telephone communication systems are confronted by one or more of the following limitations presently existing in conventional systems: that special wiring is required; that the existing telephone subsets are obsoleted; that the cost is excessive in consideration of a residential market; that only limited performance is provided in the event of power failures; that the available PABX type features are limited; and that after installation, further expansion and growth is difficult in time and/or expense.

SUMMARY OF THE INVENTION

Accordingly, it is one object of the present invention to provide a telephone communication system providing substantially all intercom and PABX type features to a plurality of telephone subsets associated with a single pair of telephone wires.

This object is accomplished, at least in part, by a communication system including means for transparently accessing a single existing pair of telephone wires and means, interconnected between each one of a plurality of telephone subsets and the transparent access means, for establishing direct communication with any other subset.

Other objects and advantages will become apparent to those skilled in the art from the following detailed description read in conjunction with the appended claims and the drawings attached hereto.

DETAILED DESCRIPTION OF THE INVENTION

Figure 1:
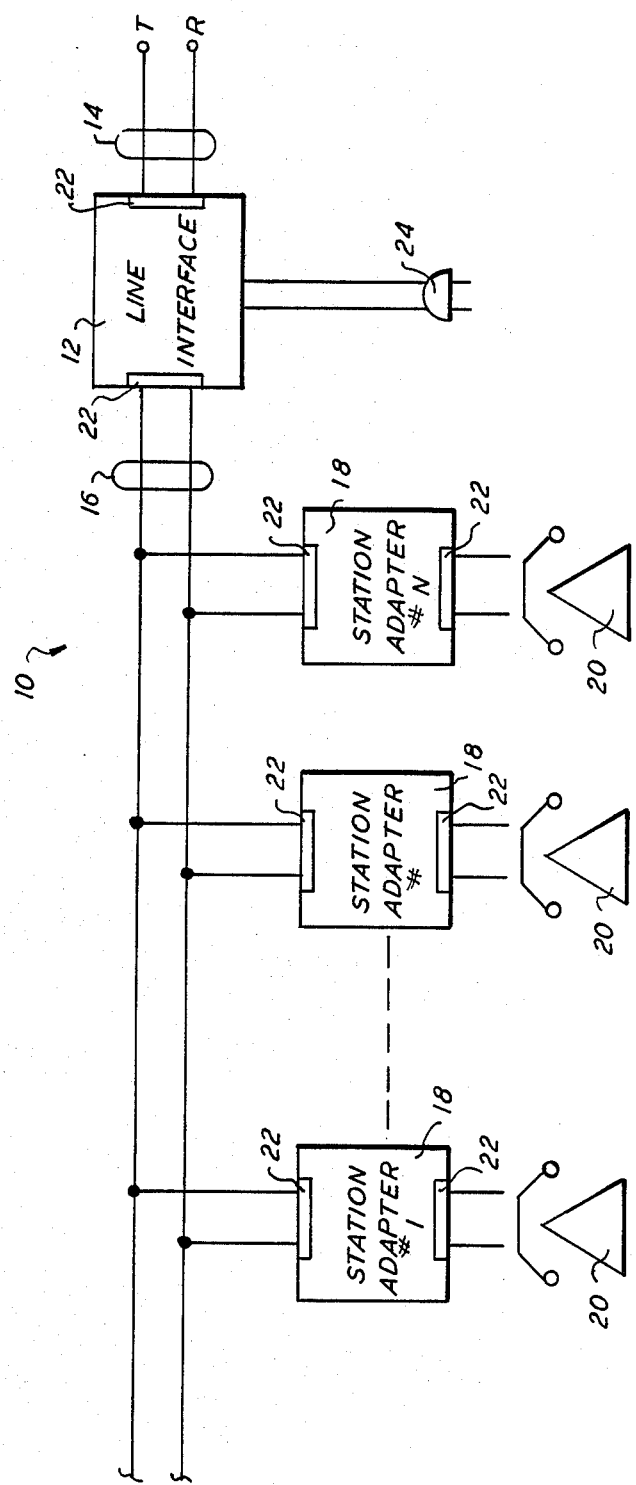
FIG. 1 is a block diagram of a system embodying the principles of the present invention.

A communication system, generally indicated at 10 in FIG. 1 and embodying the principles of the present invention, includes a line interface module 12, serially inserted between a single pair of externally connected telephone wires 14 and a single pair of in-house telephone wires 16, and a plurality of station adapter modules 18, each station adapter module 18 being connected between the single pair of in-house telephone wires 16 and a telephone subset 20. The line interface module 12 in the preferred embodiment, further includes a means 24 for connecting to a conventional residential electrical outlet. In addition, the line interface module 12 and the station adapter modules 18 are provided with standard plug-in connectors 22 for connecting to the existing wiring, 14 and 16, and the subsets 20. Hence, the line interface module 12 and station adapter modules 18 can be readily installed by even the least experienced user. For the purpose of the following description the single pair of externally connected of telephone wires 14 can be considered to be that pair of wires supplied by a telephone service provider and, in general, connect to a central office exchange. Further, the single pair of in-house telephone wires 16 is, essentially, the telephone wiring of a residence or similar building. The communication system 10, as more fully discussed below, can be used with any type of telephone subset 20 that, minimally, provides the user thereof with the capability of going off-hook, dialing a number, going on-hook and receiving an externally initiated telephone call. For example, as used herein, the term telephone subset 20 is intended to include a rotary dial subset providing only plain old telephone service (P.O.T.S). In fact, the provision of intercom and PABX type features in conjunction with such a subset is a significant advantage of the communication system 10. As more fully discussed below the system 10 is, preferably, provided with means 24 for connection to a conventional residential wall outlet as a source of electrical power.

Figure 2:
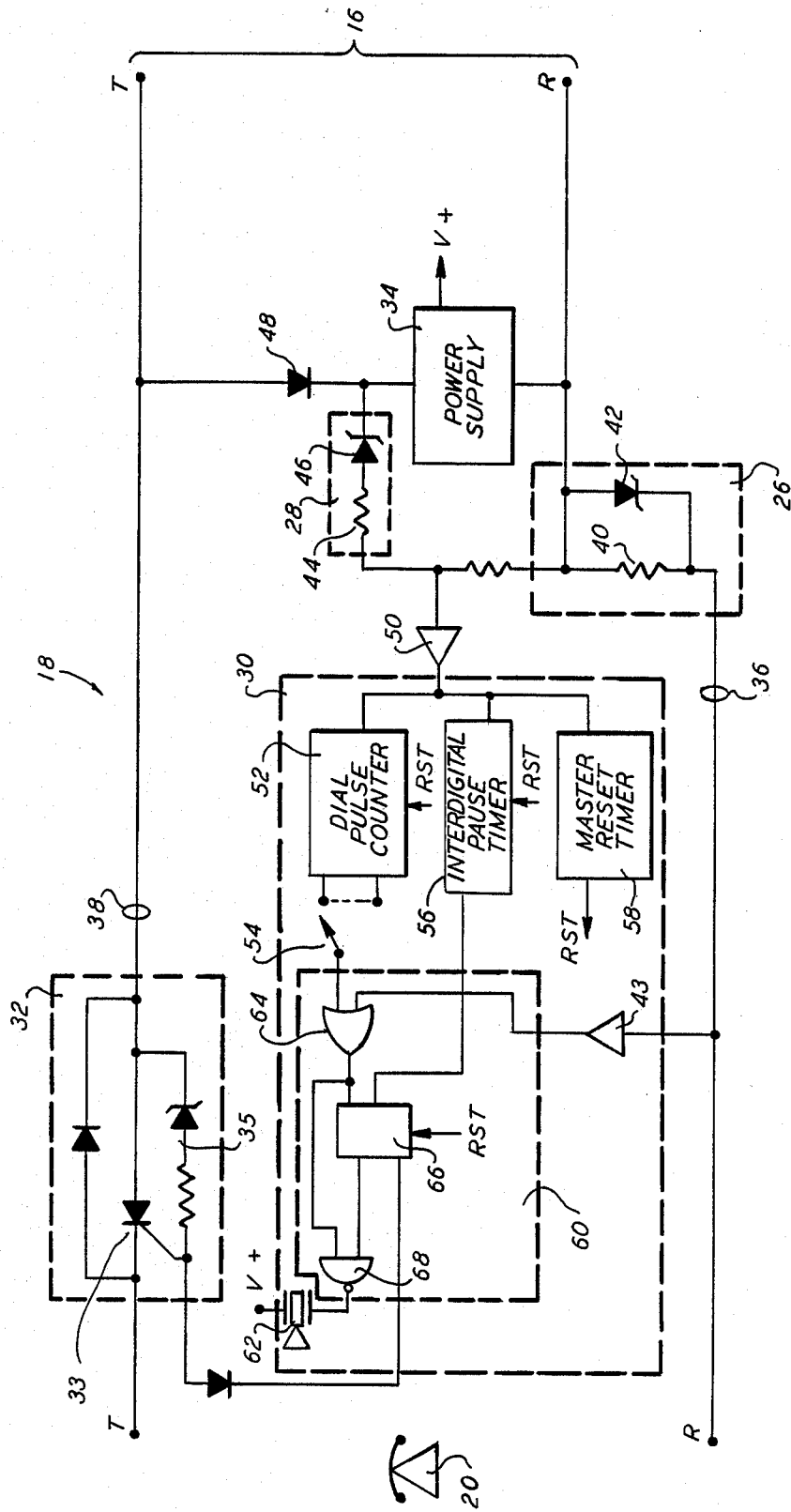
FIG. 2 is a generalized circuit diagram of a typical station adapter module for use as shown in FIG. 1.

In the preferred embodiment, each station adapter module 18 includes, as shown in FIG. 2, means 26 for detecting when the subset 20 associated therewith goes off-hook, means 28 for detecting dial pulses presented on the in-house telephone wires 16, means 30, responsive to the dial pulse detecting means 28, for selectively signalling the presence of a call directed to the associated subset 20, and means 32 for ensuring privacy during both internal and/or external calls involving the subset 20 associated therewith. In addition, each station adapter module 18 is provided with a source 34 of d.c. power that, as more fully discussed below is supplied by the line interface module 12.

In one embodiment, the off-hook detector means 26 is serially connected in one 36 of the in-house wires and the privacy control means 32 is serially connected in the other 38 in-house wire. The privacy control 32, as more fully discussed hereinafter, essentially determines the number of subsets 20 that are off-hook by monitoring the voltage drop on the in-house telephone wires 16. If 0, 1 or 2 subsets 20 are off-hook the silicon control rectifier (SCR) switch 33 is turned on by Zener diode circuit 35 and the subset 20 is connected to the in-house wires 16. When a third subset 20 goes off-hook the resulting voltage is too low to turn on the SCR switch 33 thereof and that subset 20 is not connected to the in-house wires 16. When a connection is made via the above process, the off-hook detector 26 and 43 signals the control logic 60 that latches on the privacy control means 32 so that the talking circuit to the local subset 20 remains connected throughout the call.

As shown in FIG. 2, for example, the off-hook detector means 26 includes a resistor 40 in parallel with, for example, a Zener diode 42 and comparator 43. Hence, when the local subset 20 goes off-hook the impedance change caused thereby causes the impedance of the off-hook detector means 26 to change under the new biasing condition of the diode 42. As a result, a signal is presented to a control portion 43 of the means 30. The control portion 43 in conjunction with the privacy control means 32 then, if no other subset 20 is off-hook, connects the local subset 20 to the line interface module 12 via the in-house telephone wires 16.

The dial pulse detecting means 28, in this embodiment, includes a bias resistor 44 in series with a Zener diode 46. The diode 46 is also connected, via a rectifying diode 48, across the pair of in-house telephone wires 16. Dial pulses from remote subsets 20 are detected by the means 28 and amplified by amplifier 50. The amplified signals are fed to the call signal selecting means 30.

The call signal selector means 30 includes a dial pulse counter 52, means 54 for identifying a local subset 20, an interdigital pause timer 56, a master reset timer 58 and control logic 60. Preferably, the dial pulse counter 52 is a resettable counter that changes the output level on one output line thereof in accordance with the pulse count received at the input thereto. The dial pulse counter 52 can be readily implemented by use of a CD 4017, manufactured and marketed by RCA Corp. of Somerville, N.J., although functionally equivalent circuits, or devices, can also be used. The means 54 is in essence, a switch that connects the control logic 60 to one output port of the dial pulse counter 52. Preferably, the switch is adapted to be accessible to and set by the user and thus allows the local subset 20 to be identified as desired. Usually, for present residential type purposes, the identification is limited to a single digit. Thus, when the correct number of pulses is counted by the dial pulse counter 52, the control logic 60, in response to the change in signal level at the switch, enables a call announcer 62. Any other number of pulses counted has no effect on the control logic 60. As more fully discussed below, the fact that the correct number of pulses identifying the local subset 20 is received by the control logic 60 is only one condition necessary to activate the call announcer 62. For example, the call announcer 62 would not be activated, even if the correct number of pulses were received, if the local subset 20 were already off-hook.

The interdigital pause timer 56 is connected to the control logic 60 and mandates that a preselected delay expire before the call announcer 62 is activated. This timer 56 can be implemented by an ICM 7555, manufactured and marketed by Intersil of Cupertino, Calif. The interdigital pause timer 56 is, in essence, a clock that is activated by the rising edge of the first pulse received from the dial pulse detecting means 28 and reset by subsequent pulses and provides an output enabling signal to the control logic 60 after a time period T. Preferably, the time period T is set to allow the longest make cycle in a dial pulse sequence, i.e. T is set equal to the expected time between pulses plus a margin to ensure accuracy. For example, T is set to about 40 msec in a 10 pulse per second dialer. Alternatively, the time period T could be set so that, the digit "0" on a rotary dial subset will have had time to be recorded by the counter 52. The timer 56 prevents partial readings from activating the call announcer 62. That is, the processing speed of the control logic 60 is much faster than the time required for counting pulses generated by a subset 20. Hence, the dialing of any digit greater than the identifying digit of the local subset 20 could, but for the interdigital pause timer 56, cause the false announcement of an incoming call. The interdigital pause timer 56 is, preferably, resettable to zero to avoid consecutively dialed digits being interpreted as the sum of those digits.

The dial pulse counter 52 and the interdigital pause timer 56 are reset by the master reset timer 58. In this embodiment the master reset timer 58 is an ICM 7555, manufactured and marketed by Intersil of Cupertino, Calif. and includes a preset time out after which a reset signal is generated to all associated devices connected thereto. With this signal, the master reset timer 58 resets all associated circuitry when the local subset 20 goes on-hook.

The control logic 60, in this embodiment, includes an OR gate 64, a flip-flop 66 and a NAND gate 68. By this arrangement, for incoming calls to the local subset 20, the flip-flop 66 will only receive a call announcement signal when the following conditions are met: a correct number of pulses are received by the dial pulse counter 52 and the subset 20 is on-hook. However, the call announcer 62 will be activated, via the NAND gate 68, when the state of the flip-flop 66, as per the privacy control means 32, indicates that the line, i.e. the in-house wires 16, are not already in use by more than one remote subset 20.

For outgoing calls, as determined by the local subset 20 going off-hook the control logic 60 is enabled by the off-hook detector 26. If no other subset 20 connected to the in-house wires 16 is off-hook, as determined by the privacy control 32, the local subset 20 is connected to the in-house wires 16.

Figure 3:
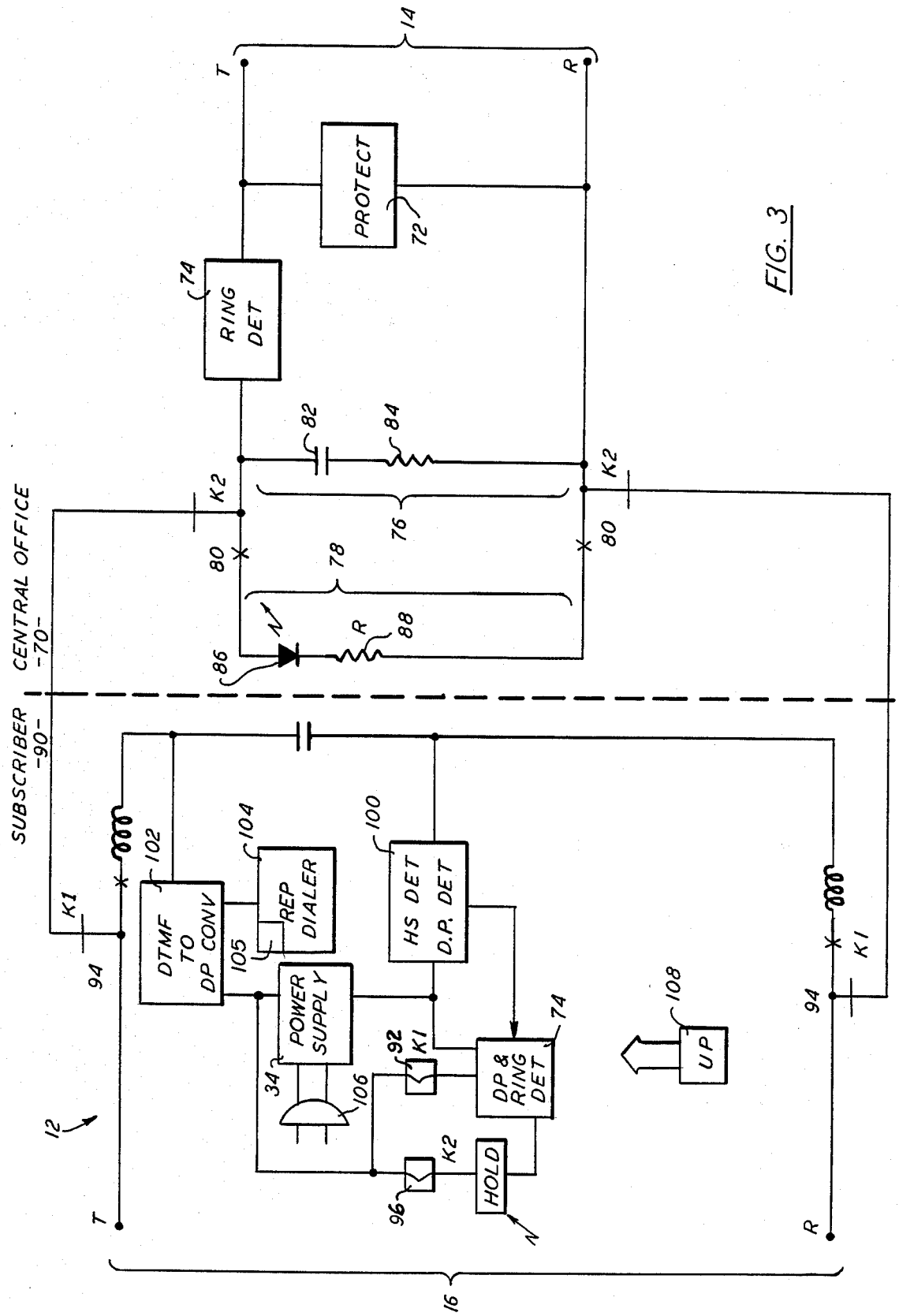
FIG. 3 is a generalized circuit diagram of one embodiment of the line interface module for use as shown in FIG. 1.

The line interface module 12 connects the in-house telephone wires 16 to the externally connected, or central office, telephone wires 14. One embodiment of the line interface module 12, as shown in FIG. 3, includes, on the central office side 70 thereof, a secondary surge protection means 72 across the central office wires 14, a ring detector 74 in series with one of the central office wires 14, a ringer simulator 76, a central office line hold circuit 78 and a central office side relay 80.

The secondary surge protector circuit 72 includes a resistor in series with a surge suppressor and is provided for added protection in the event of electrical surges due to, for example, lightning. The surge protector is a V150LA10A, manufactured and marketed by General Electric Corp. of Auburn, N.Y. The ring detector 74 is, preferably, a CS8204, marketed and manufactured by Cherry Semiconductor of East Greenwich, R.I., or the functional equivalent thereof in conjunction with an opto-coupler. The ringer simulator 76 is an RC series circuit connected on the subscriber side of the ring detector 74 across the central office wires 14. The ringer simulator 76 provides the proper impedance loading to enable the ring detector 74 to function. For example, the capacitor 82 can be 0.1 microfarad and the resistor 84 is about 10K ohms. The central office line hold circuit 78 is, in essence, an LED diode opto-coupler 86 and a holding resistor 88. In operation, the central office side relay 80 is nornally closed and connected to the subscriber side 90 of the line adapter module 12. However, when the relay coil 92 controlling the relay 80 is activated the central office line 14 is connected to the hold circuit 78. When the hold circuit 78 is activated, the subscriber side 90 is disconnected by the relay 80 and made available for local intercom use. The LED optocoupler informs the microprocessor and subscriber that the central office line is on hold.

The central office side 70 of the line interface module 12 is connected to the in-house wiring 16 by a subscriber relay 94 the position of which is controlled by the relay coil 96. When de-energized the relay 94 is arranged to secure connection from the in-house wires 16 to the central office side relay 80 and the central office line 14. Thus, in the event of a power failure the central office wires 14 are connected to the in-house wires 16 to, thus, provide plain old telephone service (POTS) to the subscriber.

In addition, the subscriber side 90 includes a hook switch and dial pulse detector 100, a dial tone multi-frequency (DTMF) to dial pulse converter 102, a repertory dialer 104, means 106 for connecting to a source of power and a microcomputer 108.

The hook switch and dial pulse detector 100 provides inputs to the microcomputer 108 that executes preprogrammed instructions in accordance with the number of pulses received. In one embodiment, the hook switch and dial pulse detector 100 are similar to the off-hook detector 26 and the dial pulse detecting means 28 discussed above. The DTMF to dial pulse converter 102 monitors the subscriber in-house wires 16 and allows both rotary and tone dial subsets to be used by the subscriber. The repertory dialer 104 is a 525610, manufactured and marketed by AMI of Santa Clara, Calif. and, as more fully discussed below, provides a memory 105 for a stored calling feature as well as a repeat call feature under the control of the microcomputer 108.

Figure 4:
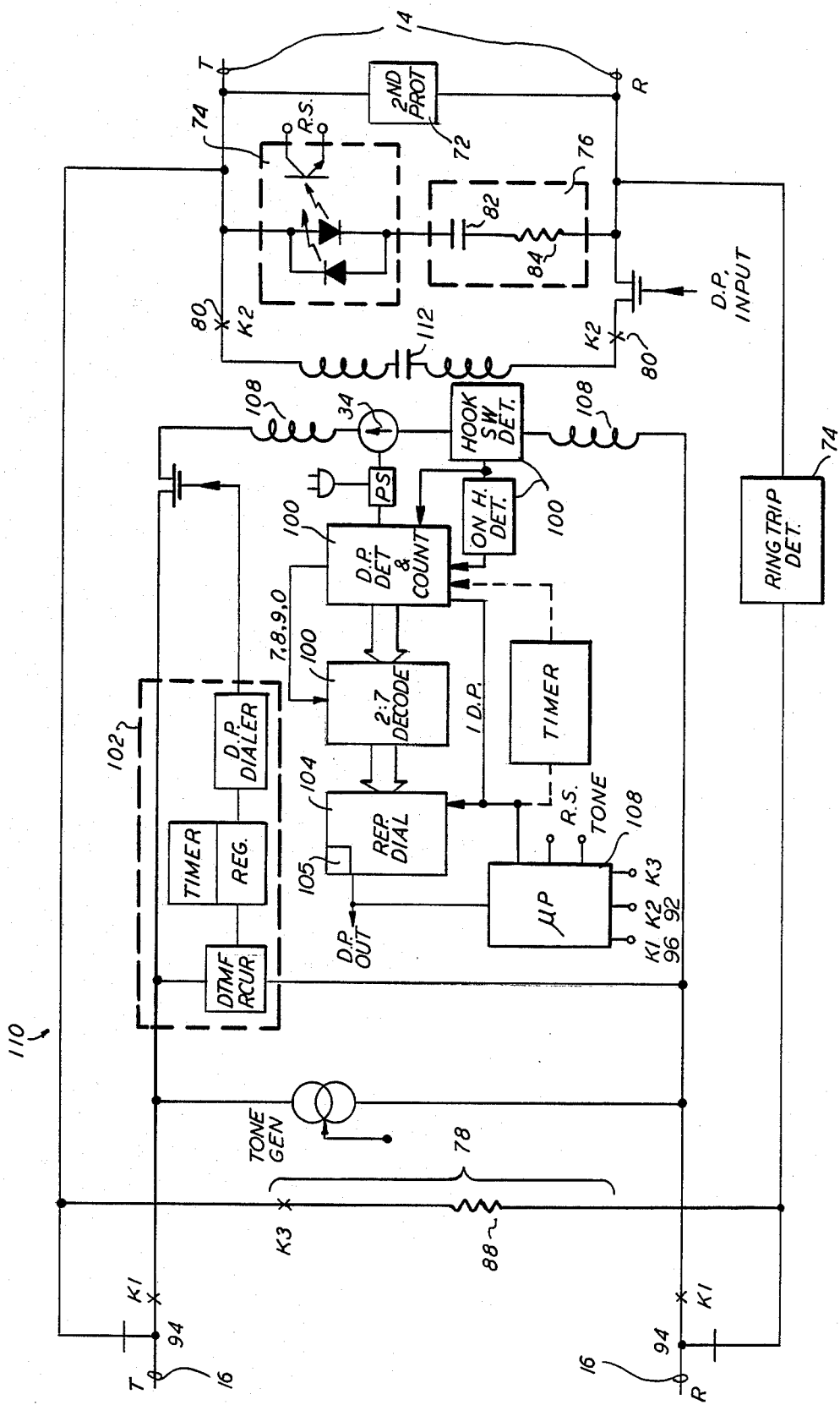
FIG. 4 is another embodiment of a line interface module for use as shown in FIG. 1.

Another embodiment of a line interface module 110 also useful in conjunction with the communication system 10 is shown in FIG. 4. For the convenience of the reader, elements that functionally correspond to previously recited elements are assigned the same identifying numbers. In general, the primary difference between the line interface module 12 and the line interface module 110 as shown in FIG. 4 is that the line interface module 110 is coupled to the externally connected wires 14 by a coupling transformer 108. In this case, the central office side relay 80 is closed only when a call is placed to the central office. On an incoming call from the central office the ring-trip detector 74 signals the microprocessor to close the central office side relay 80 to complete the voice path.

In one preferred embodiment, the communication system 10 is designed for up to nine station adaptor modules 18 for a given line interface module 12 when the communication system 10 is used for only intercom services and to about five station adapters modules 18 when PABX type features are provided. As used herein the phrase "PABX type features", or the idiomatic equivalent thereof, is intended to encompass, inter alia features such as: hold/call pick up; call transfer between subsets; conference calls; calls coming from, or going to, a central office exchange; maintaining telephonic capability during a power outage; providing secondary lightning protection; ringing on all subsets interconnected to a single line; repertory dialing; memory dialing; and the ability to interface with either rotary dial pulse phones and DTMF phones. In addition, the communication system 10, in a manner similar to a PABX, also preserves the ability to use existing types of subscriber premises equipment such as cordless or decorative subsets, telephone answering machines, or the like.

The limitation to nine subsets 20 for an intercom only system is dictated to the preference of using only a single digit to identify a particular subset 20. The tenth digit would then function as the central office access identifier digit. The limitation to five subsets 20 when PABX type features are provided is responsive to the present regulation that, in the event of a power failure, only five ringers can be connected to the central office wires 14. It will be understood that these limitations are for explanatory purposes only and that, in fact, the system 10 is not so limited.

To fully describe the operation of the system 10 of the following discussion is segmented into (a) an in-house call and (b) an extraresidential incoming call. To make an outgoing call the local subset 20 goes off hook and the control logic 60 associated therewith is informed by the off hook detector 26. If no other remote telephone is simultaneously off hook, as determined by the privacy control 32, the local subset 20 is connected to the in-house telephone wire 16. As discussed above, any single digit 0 through 9 may then be dialed. For purposes of the present discussion the digits will be assigned the following functions: 0, 1, 7, 8 and 9 will be recognized and handled by the line interface module, 12 or 110. The function of each will be more fully explained below.

The digits 2 through 6 are, in this example, local subset identifiers. Thus, when any single digit is dialed by the local subset 20, all other dial pulse counters 52 of all the other station adapter modules 18 and the dial pulse counter 100, of the line interface module 14, receive and count the digits. The digits 2 through 6 will be recognized only by the properly assigned station adapter module 18 and ignored by the line interface module 12. The digits 0, 1, 7, 8 and 9 will be recognized and handled by the line interface module 12 described hereinafter. If a dialed station adaptor module 18 is connected to the in-house wires 16, the call announcer 62 associated therewith will be activated and if that subset goes off hook a connection will be established via the in-house telephone wires 16. At this stage the privacy control means 32 detects two subsets 20 off-hook and disallows any other subset 20 from being connected to the in-house wires 16.

In this particular embodiment, the central office wires 14 are seized when the digit 9 is dialed and, responsive thereto, the line interface module 12 connects the in-house relay 94 to the central office relay 80 and the caller receives the central office dial tone. If the caller dials a 7 the repertory dialer 104 is activated and the last number previously dialed is redialed according to a timing program supervised by the microcomputer 108. If the digit 8 and a second digit between 1 and 9 is dialed the repertory dialer 104 is activated and dials a number from a memory 105 associated therewith which number being designated by the second digit dialed by the caller. In the event the digit 1 is dialed, which digit 1 can also be accomplished for signalling purposes by a conventional hook flash, the central office line relay 80 is switched to the hold circuit 78 thereby allowing intercommunication to occur between, for example, a supervisor and a secretary for incoming call announcement. The digit 0 is recognized by the microprocessor as an indication to disable the privacy controls 32 of all station adaptor modules 18 for a predetermined period of time, for example, five seconds. Such a feature then allows the signalling to each, or any number, of the local telephone subsets 20, via the call announcers 62 associated therewith, whereby a conference call can be established between a select number of the local subsets 20. After the predetermined period of time, the privacy controls 32 are enabled and the conference call is secure. To release the hold circuit 78, the call receiving subset 20 goes on hook and the subset 20 to which the call is to be transferred dials 9 to connect to central office line 14.

One technique, inter alia, to provide more diversified features is to combine the "last number dialed" or "redialed" function with the "repertory dialing" function since both of these functions can include memory accessed by the microcomputer 108. For example, the digit 8 could be assigned these features and a second digit dialed for selecting either the last number dialed, the repertory dialing or the repertory dialing programming function. This technique thus allows the digit 7 to be used to provide other features, such as, access to a power line carrier system, such as a BSR interface.

For all incoming calls the line interface module 12 is signalled with the normal ringing signal from the central office wires 14. The ringing detector 74 releases the in-house relay 94 connecting the ringing signal to the station adapter modules 18 where the ringing signal rings on all local subsets 20. When the central office senses one of the local subset 20 going off hook, the incoming call is completed to that subset 20.

The primary advantages of the communication system 10 lies in the modularity of the line interface module 12 and the station adapter modules 18 being such that the purchaser can not only perform the initial installation but expand his system as desired at any time in the future simply by adding another subset 20 and an associated and uniquely identified station adapter module 18. Thus, by use of the present system a full range of PABX features as well intercom services can be provided for residential or small businesses utilizing a single pair of externally provided telephone wires.

Although the present system has been described with regard to a specific exemplary embodiment, it will be understood that other configurations and arrangements may be implemented that nevertheless do not differ from the scope and spirit of the present invention. Consequently, the present invention is deemed limited only by the appended claims and the reasonable interpretation thereof.

What is claimed is:

1. A communication system for use with a single pair of wires, said single pair of wires having an externally connected segment and an in-house segment, said in-house segment having a plurality of subsets interconnected therewith; said system comprising:
    means for selectively providing connection between said externally connected segment and said in-house segment;
    means, interconnected between each said subset and said in-house segment, for establishing direct communication between said subsets, said subset communication means including a plurality of station adapter modules, each said station adapter module being connected between one of said subsets and said in-house segment; and
    means, associated with each said station adapter module, for identifying said subset associated therewith, each said station adapter module also including means for enabling a call announcer in response to a signal from said subset identifying means, and means for introducing a time-delay before said call announcer is enabled, said delay being at least as long as the time required for all identifiers to be received by said subset identifying means.

2. System as claimed in claim 1 wherein said subset identifying means includes a dial pulse counter and an externally settable counter output selector whereby a signal is conveyed across said selector only when the selected number of dial pulses are counted by said dial pulse counter.

3. A communication system for use with a single pair of wires, said single pair of wires having an externally connected segment and an in-house segment, said in-house segment having a plurality of subsets interconnected therewith; said system comprising:
    means for selectively providing connection between said externally connected segment and said in-house segment;
    means, interconnected between each said subset and said in-house segment, for establishing direct communication between said subsets, said subset communication means including a plurality of station adapter modules, each said station adapter module being connected between one of said subsets and said in-house segment; and means, associated with each said station adapter module, for identifying said subset associated therewith, each said station adapter module also including, means for enabling a call announcer in response to a signal from said subset identifying means, and means for introducing a time-delay before said call announcer is enabled, said time-delay being longer than the time-delay between consecutive pulses of a rotary dial subset, said time-delay being reset by each said pulse.

4. A single-line communication system, comprising:
a wiring network consisting of a single pair of wires, said single pair of wires having an externally connected segment and an in-house segment;
a plurality of subsets;
means, disposed between said externally connected segment and said in-house segment, for selectively providing connection between said externally connected segment and said in-house segment; and
a plurality of subset communication means, each disposed between a respective one of said subsets and said in-house segment and connected ony to its respective subset and said in-house segment, for establishing direct communication between selected ones of said subsets through said in-house segment, said subsets being connected only to said subset communication means, each said subset communication means including means for assigning an identifier to its respective subset, means for selectively generating a subset identifier signal corresponding with an identifier assigned to another of said subsets, means for receiving a subset identifier signal, and means responsive to a received subset identifier signal for enabling a call announcer when said received subset identifier signal corresponds to the assigned identifier signal for its respective subset.

5. A system as claimed in claim 4 further comprising:
means, in the event of a power loss, for establishing connection between said in-house segment and said externally connected segment.

6. A system as claimed in claim 4 wherein said means for selectively providing connection between said externally connected segment and said in-house segment comprises means for retaining access to said externally connected segment and simultaneously disconnecting said in-house segment therefrom, whereby a connection to the externally connected segment may be put on hold, and said in-house segment may be used for intercommunications between said subsets.

* * * * *